(12) United States Patent
Diaz et al.

(10) Patent No.: US 9,992,161 B2
(45) Date of Patent: Jun. 5, 2018

(54) DDOS PROTECTION INFRASTRUCTURES USING IP SHARING ACROSS WIDE AREA NETWORKS

(71) Applicant: The Viki Group, LLC, Miami Beach, FL (US)

(72) Inventors: Manuel Diaz, Miami, FL (US); Chris Kurzweg, Miami, FL (US); Jonathan Ham, Miami, FL (US)

(73) Assignee: THE VIKI GROUP, INC., Miami, FL (US)

( * ) Notice: Subject to any disclaimer, the term of this patent is extended or adjusted under 35 U.S.C. 154(b) by 140 days.

(21) Appl. No.: 15/048,165

(22) Filed: Feb. 19, 2016

(65) Prior Publication Data

US 2016/0173517 A1   Jun. 16, 2016

Related U.S. Application Data

(63) Continuation-in-part of application No. 14/294,650, filed on Jun. 3, 2014, now Pat. No. 9,350,668.

(51) Int. Cl.
*H04L 29/06* (2006.01)
*H04L 29/12* (2006.01)
(Continued)

(52) U.S. Cl.
CPC ........ *H04L 61/2084* (2013.01); *H04L 45/741* (2013.01); *H04L 47/125* (2013.01); *H04L 45/12* (2013.01); *H04L 61/2514* (2013.01)

(58) Field of Classification Search
USPC .......................................................... 726/12
See application file for complete search history.

(56) References Cited

U.S. PATENT DOCUMENTS 7,331,060 B1 * 2/2008 Ricciulli ............. H04L 63/1458
                                                        709/227
8,694,658 B2 * 4/2014 Gao ........................ H04L 63/20
                                                        709/227
(Continued)

OTHER PUBLICATIONS

"PCT Notification of Transmittal of the International Search Report and the Written Opinion" International Searching Authority, dated Dec. 27, 2016, for International Application No. PCT/US2016/053736, 9pgs.

*Primary Examiner* — Jason Lee
(74) *Attorney, Agent, or Firm* — Buckley, Maschoff & Talwalkar

(57) ABSTRACT

According to some embodiments, a plurality of geographically remote distribution points may be established, each distribution point being associated with a traffic cleaning or scrubbing center. Incoming traffic at each distribution point may be received and not legitimate network traffic may be detected, wherein the not legitimate network traffic may include DDOS traffic. When not legitimate network traffic is detected, the system may filter the incoming traffic via the clearing or scrubbing center at each distribution point, or across a plurality of distribution points simultaneously (thereby diluting the attack across multiple network nodes and scrubbing centers). The filtered traffic may then be transmitted from each distribution point to a customer network via an active association, wherein responses from the customer network utilize customer infrastructure to deliver the response with or without involving the clearing or scrubbing centers.

13 Claims, 6 Drawing Sheets

(51) Int. Cl.
*H04L 12/749* (2013.01)
*H04L 12/803* (2013.01)
*H04L 12/721* (2013.01)

(56) References Cited

U.S. PATENT DOCUMENTS

| | | | |
|---|---|---|---|
| 8,949,459 B1 | 2/2015 | Scholl | |
| 2007/0022479 A1* | 1/2007 | Sikdar | H04L 63/0218 726/22 |
| 2013/0132542 A1* | 5/2013 | Zhang | H04L 45/04 709/223 |
| 2013/0263256 A1 | 10/2013 | Dickinson et al. | |
| 2014/0036663 A1 | 2/2014 | Narayanan | |
| 2015/0350155 A1 | 12/2015 | Diaz et al. | |
| 2016/0248663 A1* | 8/2016 | Patel | H04L 45/12 |

* cited by examiner

DDOS PROTECTION INFRASTRUCTURES USING IP SHARING ACROSS WIDE AREA NETWORKS

CROSS-REFERENCE TO RELATED APPLICATIONS

The present application is a continuation-in-part of U.S. patent application Ser. No. 14/294,650 entitled "SYSTEMS AND METHODS FOR IP SHARING ACROSS WIDE AREA NETWORKS" and filed Jun. 3, 2014.

FIELD OF THE INVENTION

This invention relates to systems and methods to assist with the implementation of scrubbing centers or traffic filtering infrastructures that could be used to provide DDOS protection.

BACKGROUND

Some embodiments described herein will facilitate the reception of the unfiltered traffic in the scrubbing centers and the transport of the traffic from the scrubbing center to the customer network. For example, in some cases an unauthorized party might attempt to target a site or service hosted by a web server (e.g., associated with a bank, credit card company, entertainment site, etc.). As a result, the web server might experience unusually slow network performance (opening files or accessing web sites), become unavailable, see a dramatic increase in unauthorized emails, become disconnected from a wireless or wired internet connection, etc. In some cases, a DDOS attack may lead to problems in the network branches around the computer being attacked (e.g., the bandwidth of a router between the Internet and a Local Area Network ("LAN") may be consumed by an attack). If an attack is conducted on a sufficiently large scale, entire geographical regions of Internet connectivity can be compromised.

Note that a DDOS attack might involve forging of IP sender addresses (IP address spoofing) so that the source of an attack cannot easily be identified (making it difficult to filter an attack based on source addresses). Accordingly, methods and mechanisms to efficiently received the DDOS traffic in geographically distance locations and then transport the clean traffic to the customer network will be provided in accordance with some embodiments described herein. Moreover, some embodiments may provide systems and methods for implementation of DDOS protection infrastructure.

SUMMARY

Some embodiments provide a system or method to implement an infrastructure that might be used to provide DDOS protection and facilitate the reception and transmission of network traffic destined to a third network that might need to provide continues operation even during a DDOS attack but doesn't have the resources locally to absorb and mitigate the impact of a volumetric DDOS attack.

With these as well as other advantages and features that will become hereinafter apparent, further information may be obtained by reference to the following detailed description and appended claims, and to the figures attached hereto.

DETAILED DESCRIPTION

Figure 1:
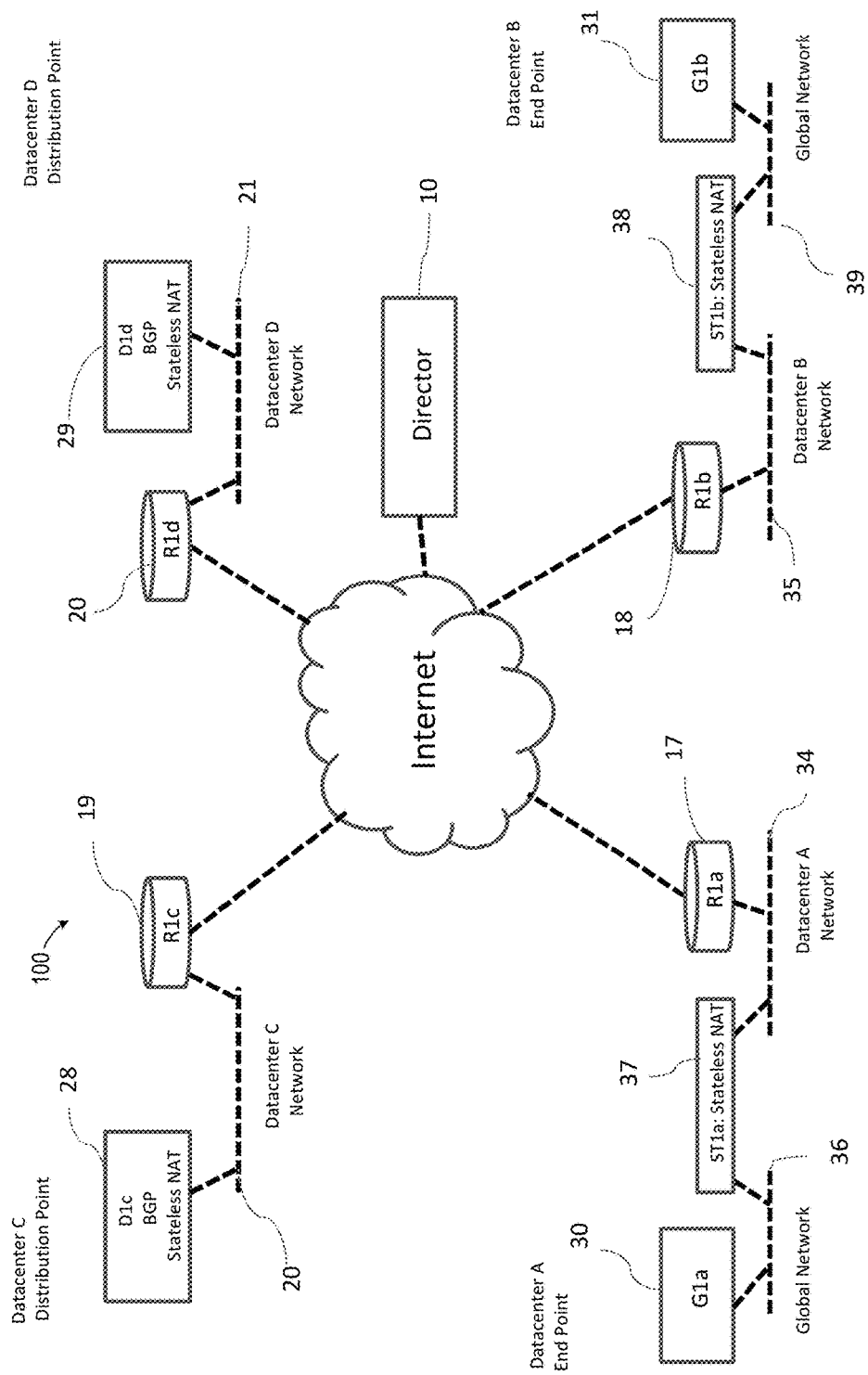
FIG. 1 is a block diagram of system architecture according to some embodiments.

As used herein, the term "scrubbing center" may refer to, for example, facilities that house computer systems and associated components, such as telecommunications and storage systems which function to receive the unfiltered traffic for an IP subnet, then separate legitimate from not legitimate traffic, for example DDOS attack traffic according to some rules and finally send legitimate traffic to the customer network so it can be processed by the intended network device. Usually, this device is a front facing server servicing customer requests directly or other servers which provide critical services for continuous operation of the customer business such as a web server, mail server, DNS server, game server etc. The actual "scrubbing" can be done by a multitude of available devices including a commodity server running IP tables, Hardware devices made by companies such as Cisco, Arbor Networks, or Palo Alto Networks. The systems can methods described here can also be integrated with companies that offer DDOS protection as a service such as Cloudflare, or Incapsula.

Some embodiments described herein allow for the reception of unfiltered network traffic in a plurality of geographically distant locations (to avoid the unfiltered traffic from concentrating in a single network) and later allows for the transmission of clean traffic to the customer private network. This proposed infrastructure is an improvement over the common procedure used today by companies offering DDOS filtering services which needs to receive traffic for their customers during an attack in their scrubbing centers and then move the clean traffic from those locations to the customer network.

Scrubbing centers are special network facilities with substantial network resources that are designed to absorb the DDOS traffic, separate legitimate from not legitimate traffic (for example, DDOS traffic) and finally transport the legitimate traffic to the customer network.

Some embodiments described herein are associated with infrastructure models and procedure to receive the unfiltered traffic and transport the clean traffic from a scrubbing center to the customer network. Moreover, some embodiments are associated with server Denial-Of-Service ("DOS") attacks and/or Distributed DOS ("DDOS"). As used herein, the phrase "DOS attack" may refer to, for example, an attempt to make a computer or network resource unavailable to intended users, such by temporarily or indefinitely interrupting or suspending services of a host connected to the Internet by sending network traffic in a way that will make the server exhaust all available resources to serve legitimate requests.

As used herein, the term "Global IP subnet" may refer to the IP address subnet that will be used in the network devices that the system is trying to protect. This subnet may have the ability to relocate instantly from one geographical location to another one based on the previous motioned document.

As used herein, the term "Global IP" will refer to an individual IP address belonging to the Global IP subnet.

As used herein, the term "datacenters" may refer to, for example, facilities that house computer systems and associated components, such as telecommunications and storage systems.

As used herein, the term "Global Network IP subnet" will refer to the IP address subnet that will have the ability to relocate instantly from one geographical location to another one.

As used herein, the term "Global IP" will refer to an individual IP address belonging to the Global Network IP subnet.

FIG. 1 is a block diagram of a system 100 according to some embodiments. The system 100 spans across four locations (Datacenter A through D) for the purposes of this explanation, but may include more than four datacenters. Note that the four locations may communicate with each other through the Internet without a dedicated link.

According to some embodiments, device 28 (D1c) is connected to Datacenter C network 20 and will advertise the Global Network IP subnet through Border Gateway Protocol ("BGP") to the internet, this location will be called a distribution point, IP traffic arriving at this distribution point for the Global Network IP subnet will be subject to stateless Network Address Translation ("NAT") and redirected to a Datacenter A network local IP address, a Datacenter B network local IP address or both. Note that Datacenter C network 20 may communicate over the Internet via a router 19 (R1c).

Similarly, the device 29 connected to Datacenter D Network 21 may also, according to some embodiments, advertise the Global Network IP subnet through BGP. Incoming traffic for the Global Network IP subnet will be subject to stateless NAT and redirected to a Datacenter A network local IP address, Datacenter B network local IP address or both. Note that Datacenter D 21 may communicate over the Internet via a router 20 (R1d).

Please note that it is possible to have only one distribution point with no redundancy or more distribution points scattered throughout the internet in different geographical locations all advertising the Global Network IP subnet Both devices (D1c, 28) and (D1d, 29) may be in active/active configuration advertising the Global Network IP subnet through BGP with the same or different AS numbers.

According to some embodiments, a device 37 (ST1a) is connected to datacenter A network 34 and will receive the traffic sent by the distribution points (Datacenter C and Datacenter D) destined to network A local subnet 34. This IP traffic will be subject to stateless NAT and destination IP will be translated back to the Global Network IP subnet, move to the Global Network 36 and delivered to the device 30 (G1a) using a Global IP Address to provide a service. Response from device 30 (G1a) will be sent directly to the initiator of the IP connection without any modification; this location will be called an end point. Note that the device 37 (ST1a) may communicate over the Internet via a router 17.

Note that some embodiments may only introduce delay in one direction and, because in most client-server interactions the majority of the traffic flow is from the server to the client, the system's impact is minimized.

Similarly, a device 38 (ST1b) is connected to datacenter B network 35 will receive the traffic sent by the distribution points (Datacenter C and Datacenter D) destined to network B local subnet 35, this IP traffic will be subject to stateless NAT and destination IP will be translated back to the Global Network IP subnet, moved to the Global Network 39 and delivered to the device 31 (G1b) using the global IP address to provide a service, this location will also be called an end point. Note that the device 38 (ST1b) may communicate over the Internet via a router 18.

Please note that to be able to redirect the IP traffic destined to the Global Network IP subnet from the distribution points to the end points, the destination IP address of that traffic will be replaced with IP addresses belonging to the local network of the datacenter of the selected end point. When the traffic arrives at the network of the datacenter selected as the end point the destination IP of that traffic will be reverted back to its original form with the destination IP in the Global Network IP subnet and delivered to the intended device using the global IP. The device using the global IP can communicate the response directly to the remote end of the IP connection without modification, thus closing the communication loop. It is important to note that stateless NAT is required, as the devices doing the destination IP swaps will only see half of the connections. Specifically the traffic destined for the Global Network IP subnet will not receive the response to the IP traffic.

A scenario when the packages from the device using the global IP flow the same path in reverse order of the incoming packages using stateful NAT may be possible but suboptimal.

Referring again to FIG. 1, the stateless NAT rules in devices 28, 29, 37 and 38 can be synchronized by a management entity or a server director 10 that will have information about: (1) the assignment of IP within Global Network IP subnet, (2) the local networks 34 and 35 in the end points, (3) the correlation between these 3 networks and traffic policies that will dictate when or how the traffic should flow from the distribution to the end points.

Please note for correlation between IP addresses within the Global Network IP subnet and end point local IP addresses could take many forms. For example, many global IP addresses can be redirected to the same end point local IP address but we could imagine that one to be the most common scenario, in a 1 to 1 scenario you will need 1 local IP in each end point that is expected to received traffic for every assigned IP in the Global Network IP subnet.

Please note that if you don't directly control the networks in the distribution and end points you will need to ask the entity in control to allow traffic with source IP addresses not belonging to the local network, to exit their network. Some administrators block this traffic to avoid IP spoofing from their network. Specifically, the distribution points will appear as a transient network. This transient passes Global IP traffic for all incoming traffic subnets to the end points. At the end points only the Global Network IP subnet could be allowed to exit the network (outbound access).

Note that FIG. 1 represents a logical architecture for the system 100 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
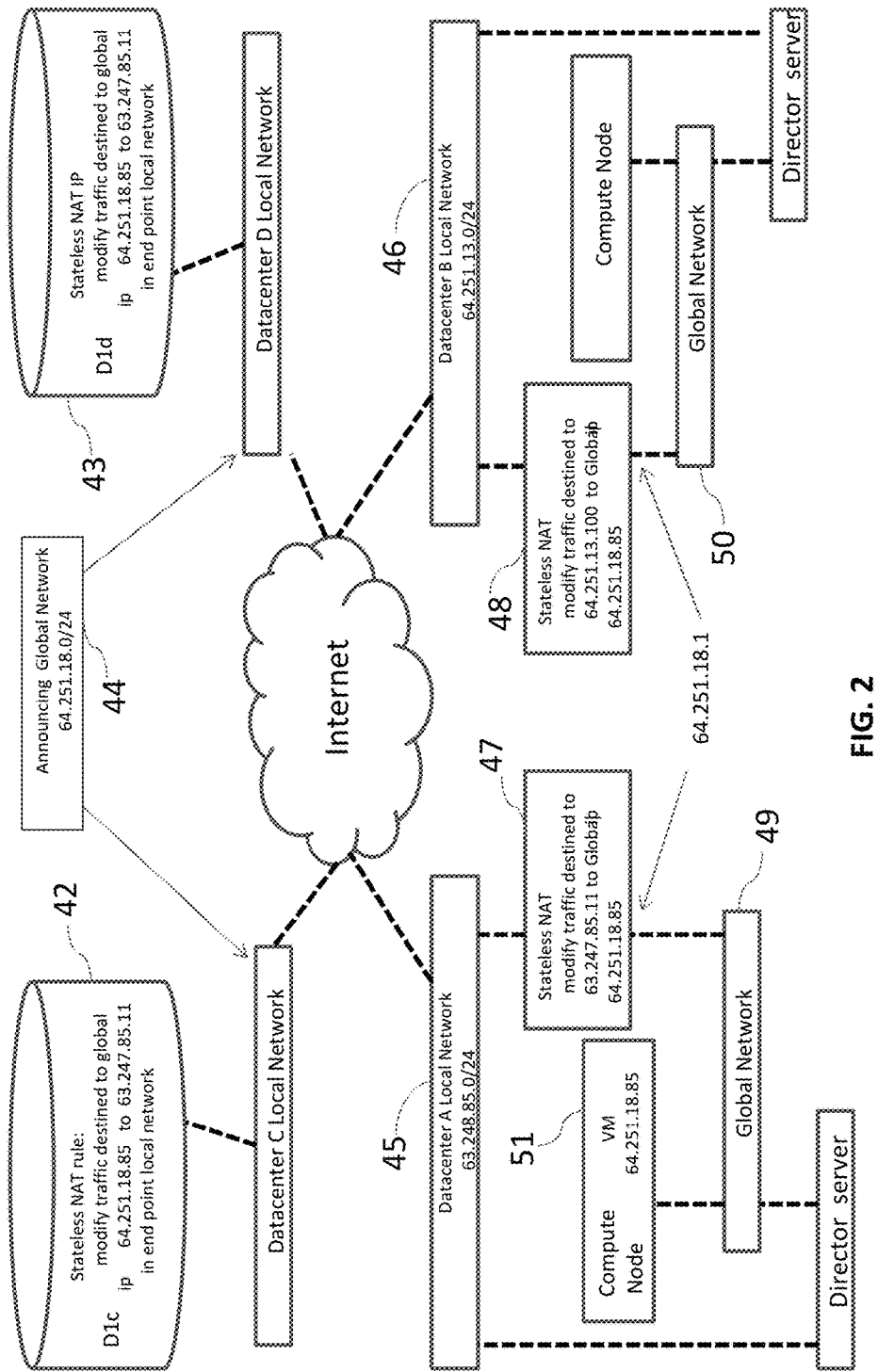
FIG. 2 is an example in accordance with some embodiments.

FIG. 2 is an example of a system with no single point of failure implementing the technology to achieve automatic virtual machine WAN live migration. In this example IPv4 subnets were used for ease of demonstration (IPv6 could be implemented as well). In this example, stateless NAT distribution devices 42 and 43 in Datacenters C and D are advertising network 64.251.18.0/24 the Global Network IP subnet 44 through BGP in a master/master configuration to the Internet. When an IP address package that is destined for the global IP address 64.251.18.85 assigned to Virtual Machine (VM) 51 arrives the Stateless NAT devices 42 and 43 in the distribution point translate the destination IP address of the IP package from 64.251.18.85 (the global IP address) to an IP address in the local network of the end point where VM 51 is currently running: Datacenter A (networks 45 in this case). When the IP package arrives to the Datacenter A network, stateless NAT device 47 translates the destination IP of the IP package from the Datacenter A IP address 63.247.85.11 to the global IP 64.251.18.85, and delivers the IP package to global network 49 and to VM 51. VM 51 replies directly to the initiator of the connection via client global network 49 and the Stateless NAT device 47 should not need to modify the outgoing IP traffic in any way. Note that FIG. 2 further includes a datacenter B local network 46, a datacenter B stateless NAT device 48, and a global network 50.

Figure 3:
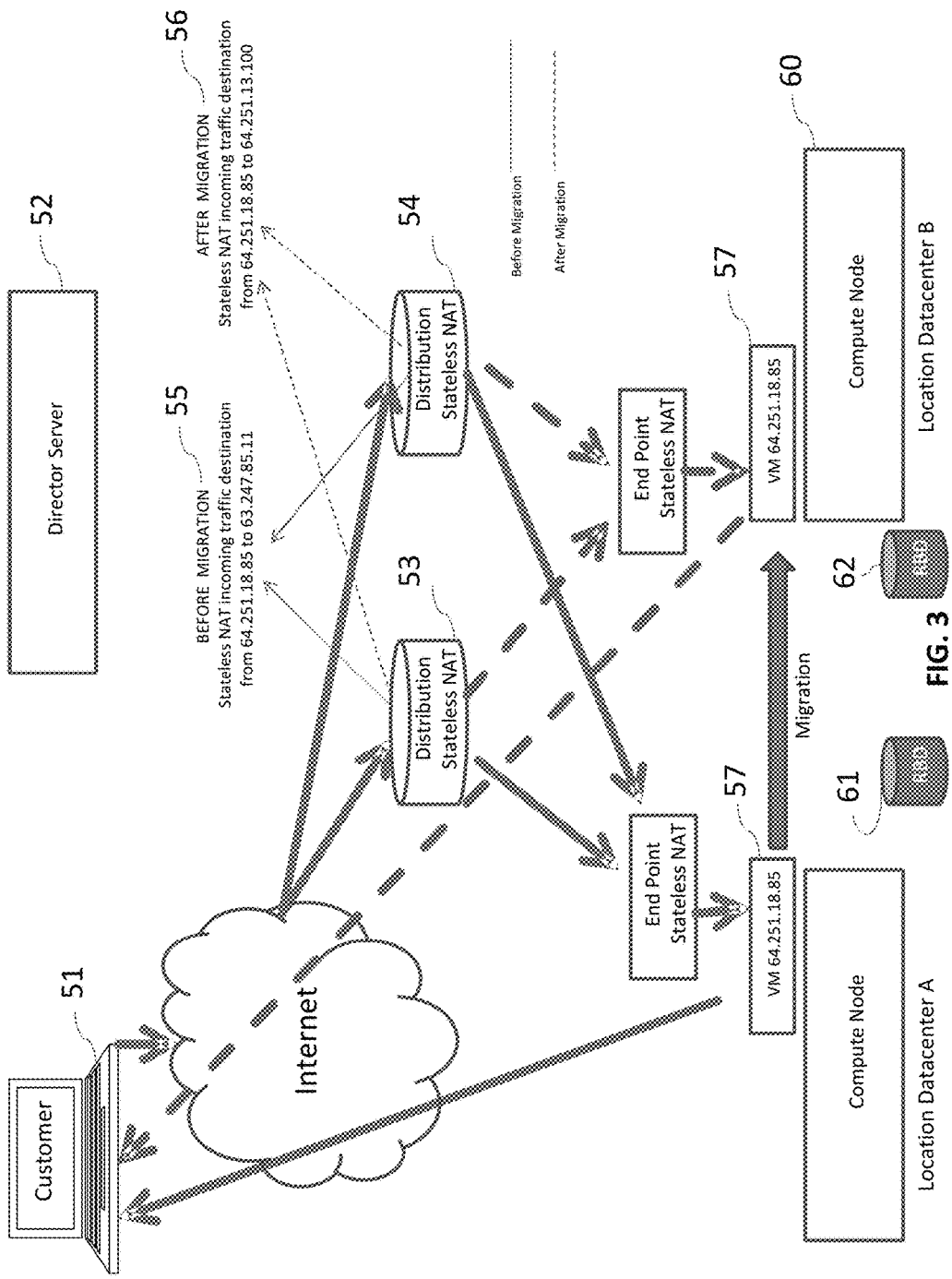
FIG. 3 is a traffic flow diagram according to some embodiments.

FIG. 3 illustrates IP traffic flow both when a customer 51 is communicating with VM 57 (running in Datacenter A) during a live migration. The solid lines show the initial communication flow. In particular, the IP traffic leaves Customer 51 and travels through the Internet to arrive at the states NAT distribution point devices 53 and 54. Devices 53 and 54, using the pre-migration 55 Stateless NAT rules, redirect the traffic to Datacenter A where VM 57 is running. During live migration, device 52 will verify that the destination compute node 60 is prepared to run VM 57 and that the storage devices RBD 61 and 62 are synchronized. Device 52 will then initiate the migration and, upon a successful migration, modify the stateless NAT rules in distribution devices 53 and 54 (to "post-migration" rules 56) to redirect the traffic from Datacenter A to Datacenter B instantly.

Device 52, using the ZIP codes of the four datacenter locations, could check different sources for severe alerts, including: available weather APIs for severe weather alerts, Earthquake Hazards Program (seismic activity) data, etc. to schedule a migration accordingly. Device 52 could also react to unpredictable events and start the VM in an available end point if one becomes unreachable for any reason. Device could also provide a WEB/CLI interface to schedule or perform migration.

This dispersed system spans across four datacenters with no single point of failure, two datacenters running cloud infrastructure and providing resources to run multiple VMs, and the other two redirecting the Internet Protocol traffic to the datacenters where the VMs are running (distribution points). The distribution point devices must be capable of doing stateless NAT and perform BGP announcement, these functions can be performed by one device or a combination of devices. By way of example, the devices doing the BGP announcement might be CISCO or JUNIPER routers, or a LINUX server running software such as QUAGGA and the devices doing the stateless NAT in the distribution and end points could be a Linux server or embedded device running IP tables with Xtables-addons modifying the PRE-ROUTING chain inside the RAWDNAT table to create the stateless NAT rules. Any other device or software that provides similar functionalities can also be used.

Because these devices see all the traffic that arrives to the VM, it may be also suitable to place Intrusion Detection Systems ("IDS") to protect the Global network IP subnet and infrastructure if desired.

("DRBD") and DRBD proxy could be used in this example to support storage WAN replication for the VM migration. Note that a DRBD proxy may be deployed in a variety of high-latency, low-bandwidth environments but other technologies might also be used to implement the storage WAN replication Because a layer 2 split does exist in the Global network IP subnet, VMs can form groups of one VM or more that device 52 may treat as if they form a unity (and must run in the same datacenter or end point). For example, a VM serving as a database server and a VM serving as a web-server may form a group that must run at the same end point. If one of the VMs needs to be migrated to an alternate end point, the other VMs in the group should be migrated as well.

Figure 4:
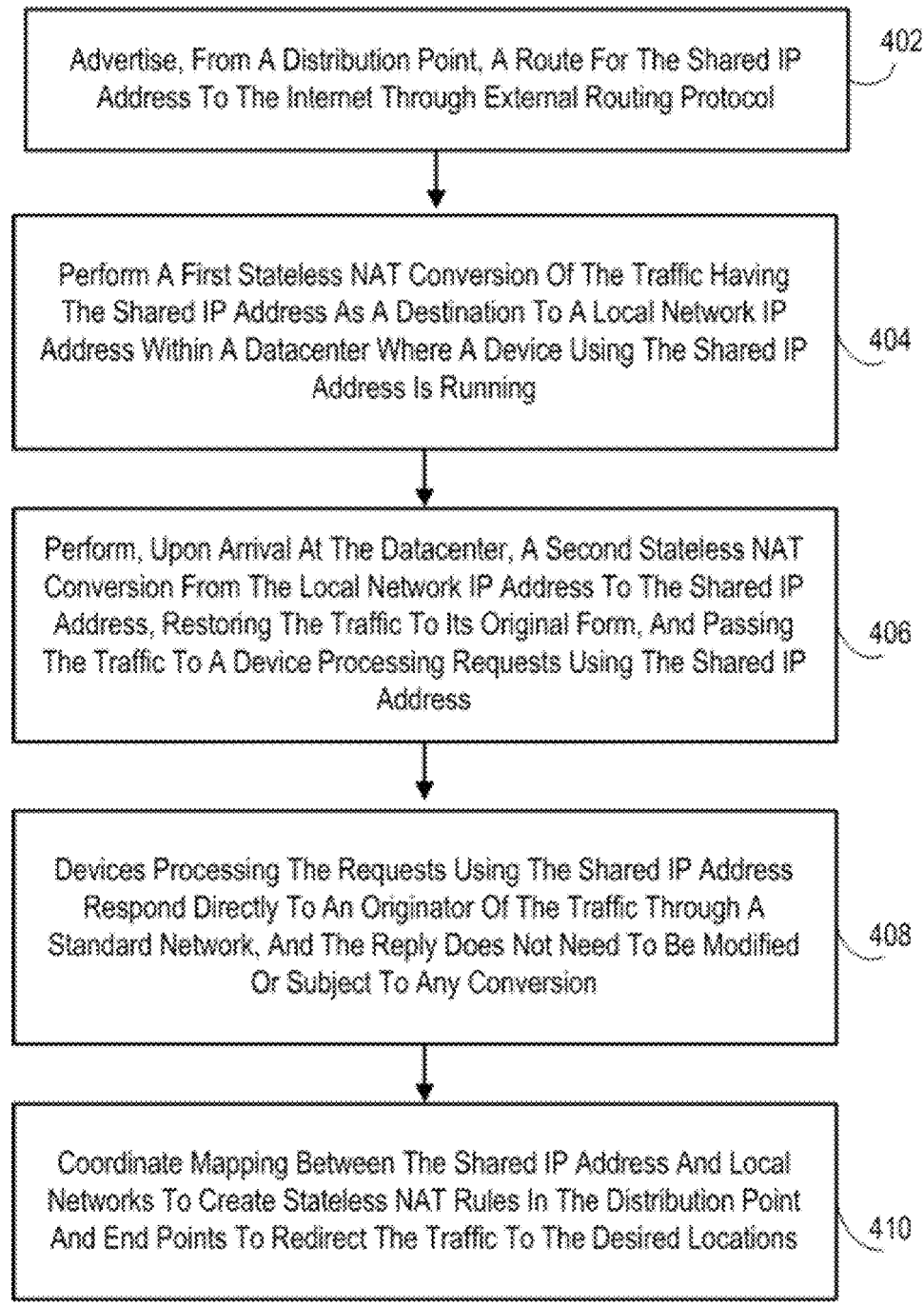
FIG. 4 illustrates a method in accordance with some embodiments.

FIG. 4 illustrates a method in accordance with some embodiments. The method may be associated with, for example, sharing an IP address (e.g., an IPv4 address or IPv6 address) between geographically distant locations and redirecting IP traffic instantly to desired locations in a system. Note that the method of FIG. 4 might be associated with, for example, a failover process, virtual machine migration, and/or load balancing. At 402, a distribution point may advertise a route for the shared IP address to the Internet through external routing protocol (e.g., BGP). Note that more than one distribution point might be associated with any of the embodiments described herein.

At 404, the distribution point may perform a first stateless NAT conversion of the traffic having the shared IP address as a destination to a local network IP address within a datacenter where a device using the shared IP address is running. At 406, upon arrival at the datacenter, a second stateless NAT conversion may be performed from the local network IP address to the shared IP address, restoring the traffic to its original form, and passing the traffic to a device processing requests using the shared IP address, At 408, the devices processing the requests using the shared IP address respond directly to an originator of the traffic through a standard network (e.g., a Multi-Protocol Label Switching ("MPLS") network or public Internet links), and the reply does not need to be modified or subject to any conversion. At 410, mapping between the shared IP address and local networks may be coordinated to create stateless NAT rules in the distribution point and end points to redirect the traffic to the desired locations. Note that 410 might be performed, for example, by a director server or management entity.

Figure 5:
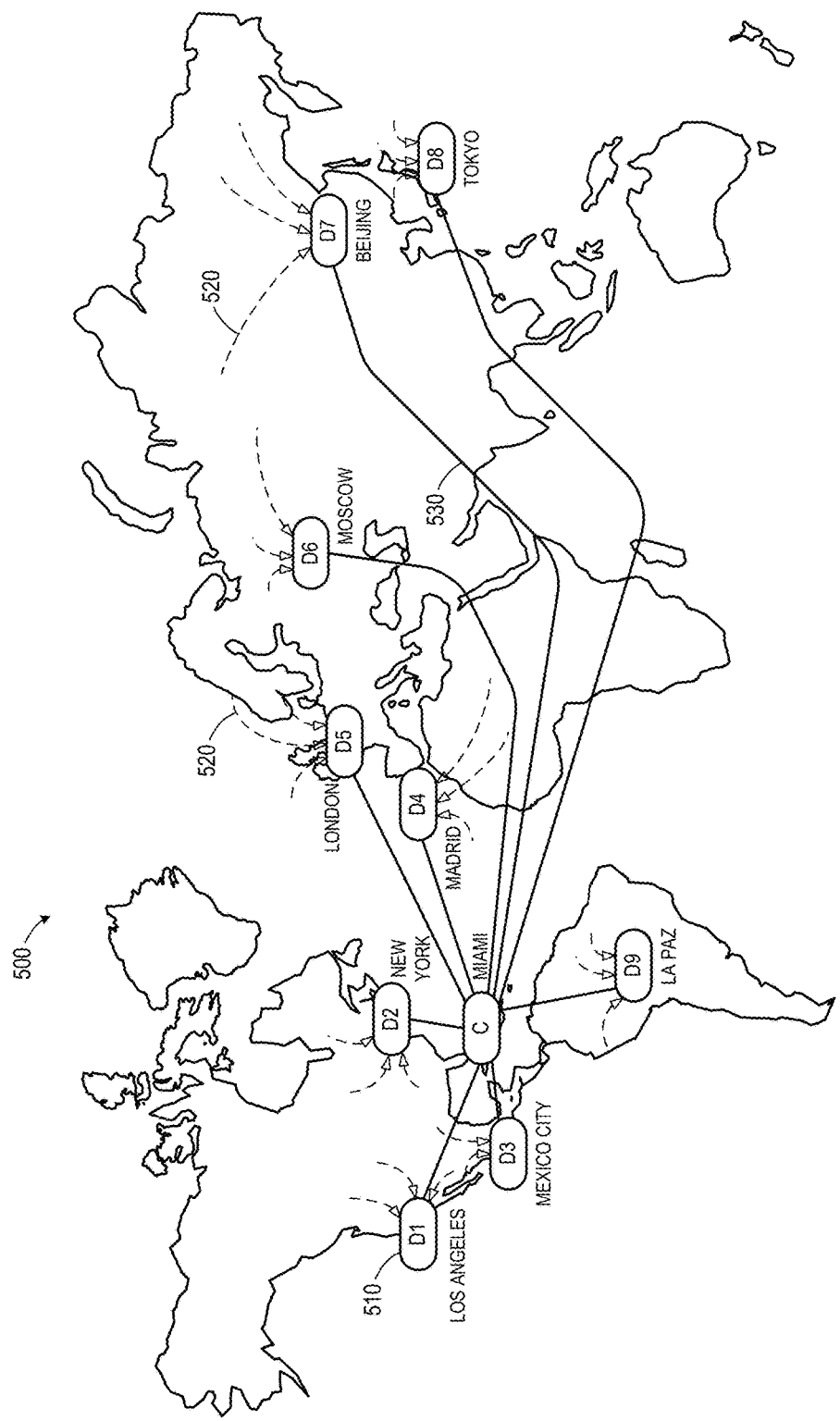
FIG. 5 is an example of a DDOS protection infrastructure according to some embodiments.

Some embodiments described herein may implement IP sharing across WAN technology to support the operation of DDOS protection infrastructures. For example, FIG. 5 is an example of a DDOS protection system 500 according to some embodiments. The system 500 includes many network nodes or distribution points 510 (D1, D2, D3, D4, D5, D6, D7, D8, and D9) scattered around the globe. These distributions points 510 may advertise a global subnet through BGP in different continents, such as Asia, Europe, North America, and South America.

Incoming traffic (T) 520 (illustrated with dashed lines in FIG. 5) for the global subnet arrives at the nearest distribution point 510 based on the BGP algorithm for best path selection, which has uses the best path length to an autonomous system ("AS-PATH" length) as a parameter. The distribution points 510 may share the infrastructure with scrubbing centers so that, as traffic 520 arrives at each location, it can be filtered. Once clean traffic (CT) 530 (illustrated with solid lines in FIG. 5) is ready to be transmitted to the customer network (C), it will travel from the distribution points 510 to the end point and be delivered to the customer network C (which is configured to use the global IP address) to complete the network circuit. According to some embodiments, the customer network will respond directly to end users using the infrastructure already in place.

As a result of this approach, unfiltered traffic may never concentrate in a single network because distribution points are distributed around the world. Moreover, bandwidth may be preserved as DDOS traffic will go to the nearest distribution point 510 and get filtered there without having unfiltered traffic cross costly transcontinental links. In addition, embodiments may improve outbound traffic routes where the reply from the host goes directly to the end user without the need to return to the scrubbing centers (as with a VPN solution). Further, BGP changes may be avoided, once the system is in place, when moving move IPs between locations. Note that some embodiments described herein may represent a more secure solution because the "scrubbing center" does not see replies from the end users network.

Moreover, some embodiments may provide a more efficient use of a Global IP subnet because larger networks can be shared among different customers independent of location. For example, Global IP address "64.251.13.100" traffic might be going to Miami where customer A network is located while "64.251.13.101" traffic might belong to customer B network which is located in Paris.

Figure 6:
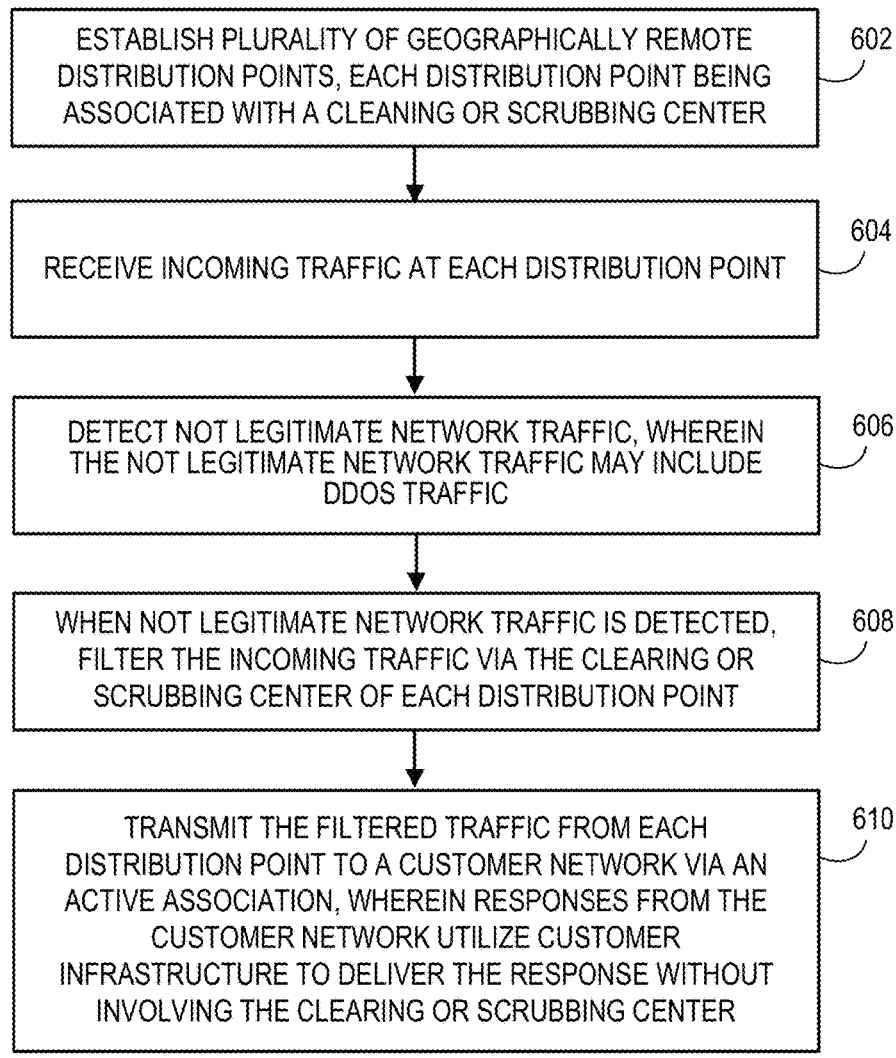
FIG. 6 illustrates a DDOS protection method in accordance with some embodiments.

FIG. 6 illustrates a DDOS protection infrastructure in accordance with some embodiments. At 602, a plurality of geographically remote distribution points may be established, each distribution point being associated with a cleaning or scrubbing center.

According to some embodiments, each distribution point may advertise an IP subnet through BGP. This will be the Global IP Subnet, the unfiltered incoming traffic for that Global IP Subnet will arrive to the distribution points in accordance with BGP algorithms for best path selection (e.g., the algorithm for best path selection might use AS-PATH length as a parameter). Traffic destined for the Global IP Subnet will arrive to the nearest distribution point and it might pass through the scrubbing center located in the same facility where the unfiltered traffic arrives. The scrubbing center might detect DDOS or other not legitimate traffic according to some rules and it might filter it. In this way unfiltered traffic will never concentrate in a single network as distribution points are deployed in multiple locations. Once the traffic destined for the Global IP subnet has been filtered in the scrubbing center, it might be transmitted from each distribution point to a customer network via an active association as described with respect to FIGS. 1 through 4 herein, and the operation may consist of applying two stateless NAT transformations to the traffic so it can arrive to the customer network and ultimately to the network device or server configured with a Global IP address and providing critical service that needs to remain operational.

The initial stateless NAT is performed at the Distribution Points to redirect the traffic to an IP address that reside inside the customer network and once the traffic arrives to the customer network a second stateless NAT is applied in the datacenter points to revert the traffic back to the original form as described with respect to FIGS. 1 through 4 herein. The responses from the network device using the Global IP address is transmitted directly from the customer network using the customer infrastructure without involving distribution points or scrubbing centers.

In this proposed method improved outbound traffic route is achieved as the reply goes directly to the end user without the need to go to the scrubbing centers as with a VPN solution. There is also no BGP change needed once the system is in place and it is more secure as the scrubbing centers never see the network traffic originating in the customer network.

This method may also provide an efficient use of the Global IP subnet as it can be shared among different customers independently of their network location.

Referring again to FIG. 6, at 604 the system may establish a plurality of geographically remote distribution points, each distribution point being associated with a cleaning or scrubbing center. At 606, incoming traffic at each distribution point may be received, and at 608 the system may detect "not legitimate" network traffic, wherein the not legitimate network traffic might include, for example, DDOS traffic. When not legitimate network traffic is detected at 608, the system may filter the incoming traffic via the clearing or scrubbing center of each distribution point. At 610, the system may transmit the filtered traffic from each distribution point to a customer network via an active association, wherein responses from the customer network utilize customer infrastructure to deliver the response without involving the clearing or scrubbing centers.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of deploying an infrastructure to support the operation of Distributed Denial Of Service ("DDOS") attack protection, comprising:

establishing a plurality of geographically remote distribution points, each distribution point being associated with a cleaning or scrubbing center, wherein none of the distribution points are connected to another of the distributions point via a private backbone;

receiving incoming traffic at each distribution point in accordance with a Border Gateway Protocol ("BGP") algorithm, having Autonomous System ("AS")-PATH length as a parameter, for best path selection;

detecting not legitimate network traffic, wherein the not legitimate network traffic includes DDOS traffic;

when the not legitimate network traffic is detected, filtering the incoming traffic via the clearing or scrubbing center of each distribution point; and transmitting the filtered traffic from each distribution point to a customer network via an active association, wherein responses from the customer network utilize customer infrastructure to deliver the response without involving the clearing or scrubbing centers, and further wherein each distribution point advertises a global subnet through BGP and sends the same route via BGP before, during, and after the DDOS traffic.

2. The method of claim 1, wherein distribution points redirect traffic for the Global IP address by performing the following:

advertising, from each distribution point, a route for the Global IP address to the Internet through external routing protocol;

performing, by each distribution point, a first stateless Network Address Translation ("NAT") conversion of the traffic having the Global IP address as a destination replaced for an IP address within a datacenter where a device using the Global IP address is running;

performing, upon arrival at the datacenter, a second stateless NAT conversion from the local network IP address to the Global IP address, restoring the traffic to its original form, and passing the traffic to a device processing requests using the Global IP address, wherein the devices processing the requests using the Global IP address respond directly to an originator of the traffic through a customer standard network, and the reply does not need to be modified or subject to any conversion; and coordinating mapping between the Global IP address and local networks to create stateless NAT rules in the distribution point and end points to redirect the traffic to desired locations.

3. The method of claim 2, wherein the external routing protocol is Border Gateway Protocol ("BGP").

4. The method of claim 2, wherein the customer standard network is associated with a Multi-Protocol Label Switching ("MPLS") network or public Internet links.

5. The method of claim 2, wherein the IP address is an IP version 4 ("IPv4") address or an IPv6 address.

6. The method of claim 2, wherein said coordinating is performed by at least one of a director server or management entity.

7. A system to provide Distributed Denial Of Service ("DDOS") attack protection, comprising:

a plurality of geographically remote distribution points, wherein none of the distribution points are connected to another of the distributions point via a private backbone, each distribution point being: (i) associated with a cleaning or scrubbing center (ii) adapted to receive incoming traffic at each distribution point in accordance with a Border Gateway Protocol ("BGP") algorithm, having Autonomous System ("AS")-PATH length as a parameter, for best path selection, (iii) adapted to detect that not legitimate network traffic is occurring, wherein the not legitimate network traffic includes DDOS traffic, and, when the not legitimate traffic is detected, (iv) adapted to filter the incoming traffic via the clearing or scrubbing center of each distribution point; and a customer network adapted to receive the filtered traffic from each distribution point via an active association, wherein responses from the customer network utilize customer infrastructure to deliver the response without involving the cleaning or scrubbing centers, and further wherein each distribution point advertises a global subnet through BGP and sends the same route via BGP before, during, and after the DDOS traffic.

8. The system of claim 7, wherein each distribution point shares the global IP address between geographically distant locations and redirects IP traffic instantly to desired locations by being adapted to (i) advertise a route for the shared IP address to the Internet through external routing protocol, and (ii) perform a first stateless Network Address Translation ("NAT") conversion of the traffic having the shared IP address as a destination to a local network IP address within a datacenter where a device using the shared IP address is running, wherein, upon arrival at the datacenter, a second stateless NAT conversion is to be performed from the local network IP address to the shared IP address, restoring the traffic to its original form, and passing the traffic to a device processing requests using the shared IP address, and further wherein the devices processing the requests using the shared IP address respond directly to an originator of the traffic through a standard network, and the reply does not need to be modified or subject to any conversion.

9. The system of claim 8, further comprising:

a director server or management entity to coordinate mapping between the shared IP address and local networks to create stateless NAT rules in the distribution point and end points to redirect the traffic to the desired locations.

10. The system of claim 9, wherein the external routing protocol is Border Gateway Protocol ("BGP").

11. The system of claim 9, wherein the standard network is associated with a Multi-Protocol Label Switching ("MPLS") network or public Internet links.

12. The system of claim 9, wherein the IP address is an IP version 4 ("IPv4") address or an IPv6 address.

13. A non-transitory, computer-readable medium storing instructions that, when executed by computer hardware processors, cause the computer processors to perform a method for providing Distributed Denial Of Service ("DDOS") attack protection, comprising:

establishing a plurality of geographically remote distribution points, each distribution point being associated with a cleaning or scrubbing center, wherein none of the distribution points are connected to another of the distributions point via a private backbone;

receiving incoming traffic at each distribution point in accordance with a Border Gateway Protocol ("BGP") algorithm, having Autonomous System ("AS")-PATH length as a parameter, for best path selection;

detecting not legitimate network traffic, wherein the not legitimate network traffic includes DDOS traffic;

when the not legitimate network traffic is detected, filtering the incoming traffic via the clearing or scrubbing center of each distribution point; and transmitting the filtered traffic from each distribution point to a customer network via an active association, wherein responses from the customer network utilize customer infrastructure to deliver the response without involving the clearing or scrubbing centers, and further wherein each distribution point advertises a global subnet through BGP and sends the same route via BGP before, during, and after the DDOS traffic.

\* \* \* \* \*